United States Patent
Zhang et al.

(10) Patent No.: US 9,652,669 B2
(45) Date of Patent: May 16, 2017

(54) REFLECTING HANDWRITING ATTRIBUTES IN TYPOGRAPHIC CHARACTERS

(71) Applicant: LENOVO (Singapore) PTE, LTD., New Tech Park (SG)

(72) Inventors: Jianbang Zhang, Raleigh, NC (US); Jian Li, Chapel Hill, NC (US); Ming Qian, Cary, NC (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 284 days.

(21) Appl. No.: 14/488,090

(22) Filed: Sep. 16, 2014

(65) Prior Publication Data

US 2016/0078847 A1    Mar. 17, 2016

(51) Int. Cl.
| | |
|---|---|
| *G06F 17/21* | (2006.01) |
| *G06F 17/27* | (2006.01) |
| *G06K 9/00* | (2006.01) |
| *G09G 5/24* | (2006.01) |
| *G09G 5/26* | (2006.01) |
| *G06F 3/0488* | (2013.01) |

(52) U.S. Cl.
CPC ....... *G06K 9/00416* (2013.01); *G06F 17/214* (2013.01); *G06F 3/04883* (2013.01); *G09G 5/24* (2013.01); *G09G 5/26* (2013.01); *G09G 2340/04* (2013.01); *G09G 2354/00* (2013.01)

(58) Field of Classification Search
CPC .............. G06F 17/214; G06F 3/04883; G06K 9/00416; G09G 2340/04; G09G 2354/00; G09G 5/24; G09G 5/26
USPC ...................................... 345/472.3, 594, 467
See application file for complete search history.

(56) References Cited

U.S. PATENT DOCUMENTS

| | | | |
|---|---|---|---|
| 2007/0188497 A1* | 8/2007 | Dowling ............... | G06T 11/203 345/469 |
| 2014/0022260 A1* | 1/2014 | Atteberry ............ | G06F 17/2217 345/467 |
| 2014/0119659 A1* | 5/2014 | Sugiura .............. | G06K 9/00416 382/189 |
| 2014/0325351 A1* | 10/2014 | Hirabayashi ........... | G06K 9/222 715/273 |
| 2015/0123988 A1* | 5/2015 | Ohmori ................. | G06F 3/0481 345/594 |
| 2016/0063342 A1* | 3/2016 | Sugiura .................... | G06K 9/62 382/187 |

* cited by examiner

*Primary Examiner* — Jin-Cheng Wang
(74) *Attorney, Agent, or Firm* — Kunzler Law Group (57) ABSTRACT

For reflecting handwriting attributes in typographic characters, code parses calligraphic data from digitized handwriting on the touch screen display. The calligraphic data includes a character stroke slant and a character pixel matrix. In addition, the code renders the digitized handwriting with a render font selected in response to one or more of the character stroke slant and the character pixel matrix.

20 Claims, 9 Drawing Sheets

| Handwritten Input ID |
| 205 |

| Render Font |
| 210 |

| Render Font Size |
| 215 |

| Global Render Weight |
| 220 |

| Global Character Width |
| 225 |

| Global Stroke Pressure |
| 230 |

| Global Character Color |
| 235 |

| Global Character Font Size |
| 240 |

| Global Character Slant |
| 245 |

| Global Character Font |
| 247 |

| User Preferences |
| 303 |

| Sizing Type |
| 305 |

| Character Data |
| 250a |

| Character Data |
| 250b |

REFLECTING HANDWRITING ATTRIBUTES IN TYPOGRAPHIC CHARACTERS

BACKGROUND

Field

The subject matter disclosed herein relates to handwriting attributes and more particularly relates to reflecting handwriting attributes in typographic characters.

Description of the Related Art

Touch screen displays may receive handwritten input and digitize the handwritten input as digitized handwriting.

BRIEF SUMMARY

An apparatus for reflecting handwriting attributes in typographic characters is disclosed. The apparatus includes a touch screen display, a processor, and a memory that stores code executable by the processor. The code parses calligraphic data from digitized handwriting on the touch screen display. The calligraphic data includes a character stroke slant and a character pixel matrix. In addition, the code renders the digitized handwriting with a render font selected in response to one or more of the character stroke slant and the character pixel matrix. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
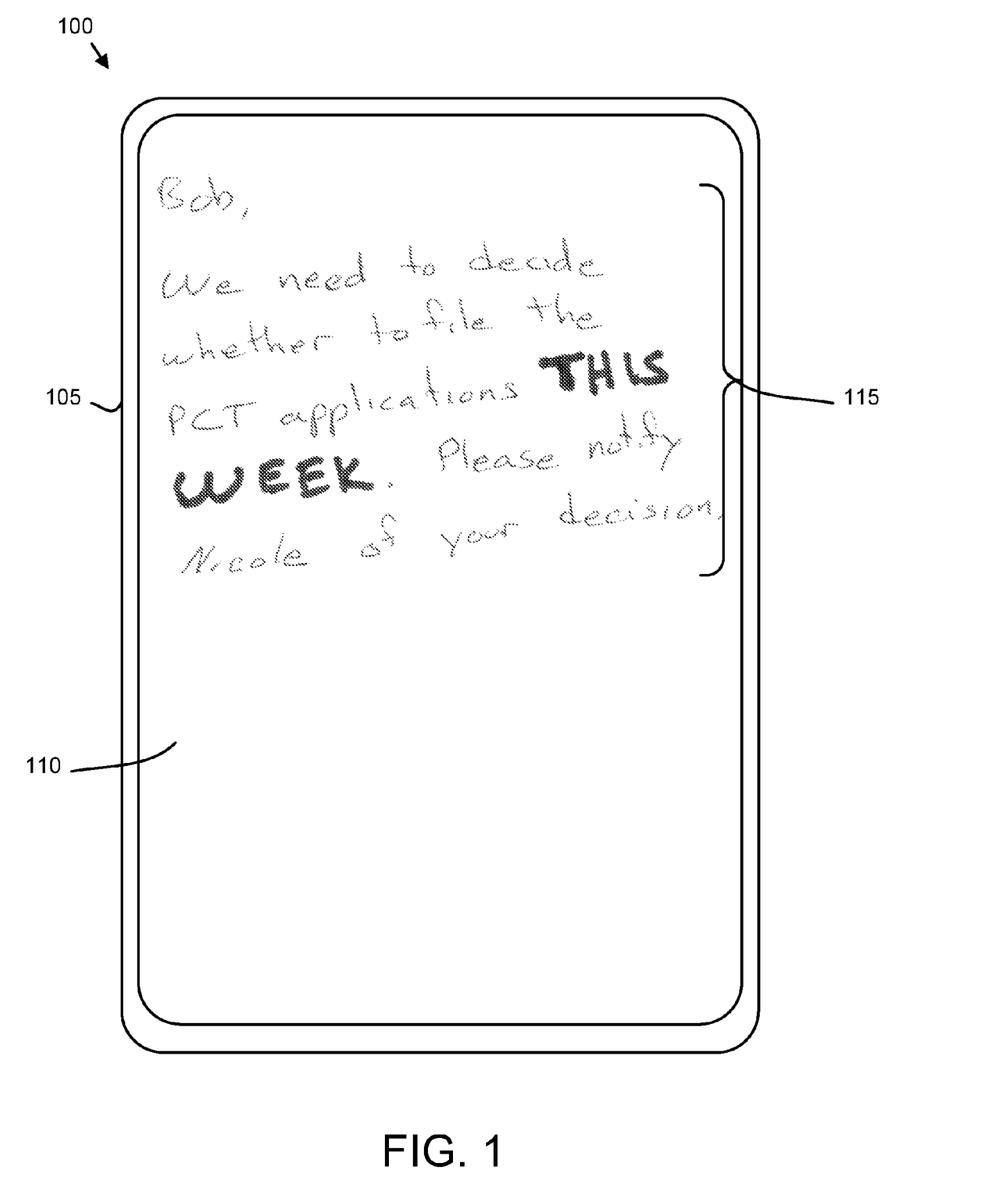
FIG. 1 is a drawing illustrating one embodiment of a touch screen system.

FIG. 1 is a drawing illustrating one embodiment of a touch screen display system 100. The system 100 includes an electronic device 105 with a touch screen display 110. The touch screen display 110 may receive a handwritten input 115. For example, a user may write on the touch screen display 110 with a stylus and/or finger. A computer may digitize the handwritten input 115 into digitized handwriting. The computer may be embedded in the electronic device 105. Alternatively, the computer may be in communication with the electronic device 105 over a network.

In the past, the handwritten input 115 was rendered with the standard font and font size. However, some handwritten input 115 may include additional information in the style of the handwriting. For example, the handwritten input 115 may include various types of emphasis and other calligraphic flourishes. Unfortunately, this additional information, referred to herein as calligraphic data, is lost when the handwritten input 115 is rendered as digitized handwriting.

The embodiments described herein parse calligraphic data from digitized handwriting. In addition, the embodiments may render the digitized handwriting with the render font selected in response to the calligraphic data as will be described hereafter. As a result, the calligraphic data is preserved in the digitized handwriting, so that the full intent of the handwritten input 115 is captured, stored, and displayed.

The computer may capture the calligraphic data from the handwritten input 115. In one embodiment, the computer digitizes the handwritten input 115 as an image and parses the calligraphic data from the image. The calligraphic data is described in more detail in FIG. 2A.

Figure 2A:
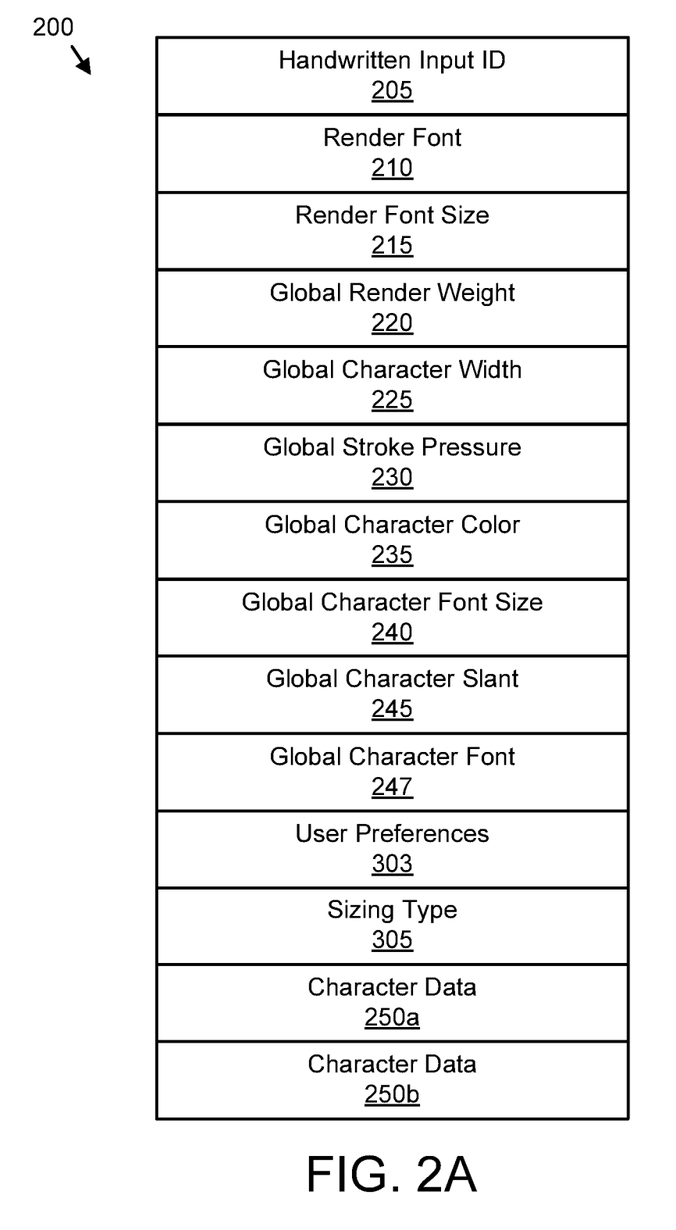
FIG. 2A is a schematic block diagram illustrating one embodiment of calligraphic data.

FIG. 2A is a schematic block diagram illustrating one embodiment of calligraphic data 200. The calligraphic data 200 maybe organized as a data structure and stored in a memory of the computer. In the depicted embodiment, the calligraphic data 200 includes but is not limited to a handwritten input identifier 205, a render font 210, a render font size 215, a global render weight 220, a global character width 225, a global stroke pressure 230, a global character color 235, a global character font size 240, a global character stroke slant 245, a global character fonts 247, a sizing type 305, and a plurality of character data 250.

The handwritten input identifier 205 may uniquely identify the handwritten input 115. In one embodiment, the handwritten input identifier 205 defines a spatial area on the touch screen display 110 that encloses the handwritten input 115. In addition, the handwritten input identifier 205 may include a timestamp. In one embodiment, the handwritten input identifier 205 includes a pointer to an image of the handwritten input 115.

The render font 210 may specify a font used to render the digitized handwriting. The render font 210 may be selected in response to the calligraphic data 200. In one embodiment, the render font 210 is selected in response to one or more of a character stroke slant and the pixel matrix of one or more characters in the handwritten input 115. Alternatively, the render font 210 may be selected in response to the global character font 247. In one embodiment, the user preference font may modify the render font 210.

The render font size 215 may specify a font size used to render the digitized handwriting. The render font size 215 may be selected in response to the calligraphic data 200. In one embodiment, the render font size 215 is selected in response to a character size of one or more characters in the handwritten input 115. In an alternative embodiment, the render font size 215 may be selected in response to the global character font size 240 and/or the global character width 225. In one embodiment, a user preference font size may modify the render font size 215.

The global render weight 220 may specify a weight for characters in the rendered digitized handwriting. The global render weight 220 may be calculated from character weights for one or more characters in the handwritten input 115. In one embodiment, the global render weight 220 is one of an arithmetic mean, an average, and a medium of the character weights. In one embodiment, a user preference weight may modify the calculated global render weight 220.

The global character width 225 may specify a width of characters. In one embodiment, the global character width 225 is calculated as one of an arithmetic mean, an average, and a medium of character widths.

The global stroke pressure 230 may be calculated from the pressure on the touch screen display 110 for the one or more characters in the handwritten input 115. The global stroke pressure 230 may be calculated as one of an arithmetic mean, an average, and a medium of character stroke pressures.

The global character color 235 may specify a color for the render font 210. The global character color 235 may be calculated from a character color of the one or more characters in the handwritten input 115. In one embodiment, the global character color 235 is calculated as one of an arithmetic mean, an average, and a medium of the character colors. In addition, a user preference color may modify the global character color 235.

The global character font size 240 may be calculated from a character size of one or more characters in the handwritten input 115. The global character font size 240 may be calculated as one of an arithmetic mean, an average, and a medium of the character sizes.

The global character stroke slant 245 may be calculated from a character stroke slant of one or more characters in the handwritten input 115. The global character stroke slant 245 may be calculated as one of arithmetic mean, an average, and a median of the character stroke slants.

The global character font 247 may be calculated from a character font of one or more characters in the handwritten input 115. The global character font 247 may include a serif value, a weight value, and a slant value. In one embodiment, the weight value is the global render weight 220. In addition, the slant value may be the global character stroke slant 245.

The user preferences 303 may specify a font size, a font, a color, and a weight, and the like. In addition, the user preferences 303 may specify whether line breaks in the handwritten input 115 are included in the digitized handwriting.

The sizing type 305 may specify criteria for selecting the render font size 215. The sizing type 305 may specify an absolute character size. In one embodiment, if the absolute character size is selected, the render font size 215 may be set equal to the global character font size 240. In addition, each character may be rendered with the character font size from the character data 250.

Alternatively, the sizing type 315 may specify a relative character size. The relative character size may specify a ratio between the global character font size 240 and the render font size 215. For example, the relative character size may specify that the render font size 215 is 80 percent of the global character font size 240.

In an alternative embodiment, the relative character size may specify that all characters with a character font size within a font size range of the global character font size 240 are rendered with a specified user preference font size. The font size range may be between 5 and 20 percent and the specified font size may be in the range of 10 to 14 point. For example, all characters with a character font size within 10 percent of the global character font size 240 may be rendered with a specified font size of 12 point.

The character data 250 may include data for each character in the handwritten input 115. The character data 250 is described in more detail in FIG. 2B.

Figure 2B:
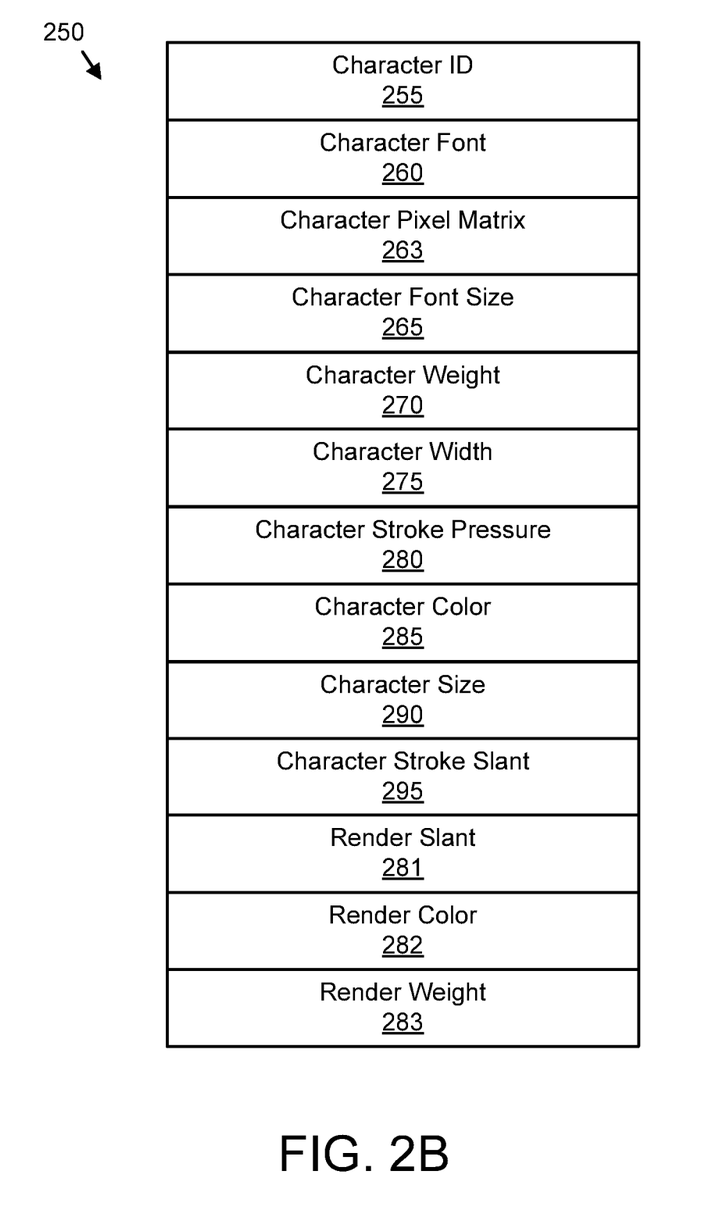
FIG. 2B is a schematic block diagram illustrating one embodiment of character data.

FIG. 2B is a schematic block diagram illustrating one embodiment of the character data 250. The character data 250 maybe organized as a data structure in a memory of a computer. In the depicted embodiment, the character data 250 includes a character identifier 255, a character font 260, a pixel matrix 263, the character font size 265, a character weight 270, a character width 275, a character stroke pressure 280, a character color 285, a character size 290, a character stroke slant 295, a render slant 281, a render color 282, and a render weight 283.

The character identifier 255 may uniquely identify a character within the handwritten input 115. In one embodiment, the character identifier 255 describes a spatial area that includes the character in the handwritten input 115. In addition, the character identifier 255 may indicate an order of the character in the handwritten input 115. For example, the order may indicate that a character is the 15th character within the handwritten input 115.

The character font 260 may identify a font that is closest to a style of the character. The character font 260 may be selected using the character pixel matrix 263.

In one embodiment, the character pixel matrix 263 is generated from pixel data. In additional, the character pixel matrix 263 may be normalized to a standard matrix size. The character pixel matrix 263 may be compared with font pixel matrices of various fonts. The font with a font pixel matrix with the least deviation from the character pixel matrix may be selected as the character font 260. In addition, the character font 260 may be modified in response to a curvature score and a flourish score.

In one embodiment, a font score is calculated for each character. The font score may be the difference between the character pixel matrix 263 and a specified font pixel matrix. The font score FS may be calculated using Equation 1, where $pw_i$ is a pixel weight, $CP_i$ is a character pixel matrix pixel, and $MP_i$ is a font pixel matrix pixel. A font with a lowest font score may be selected as the character font 260.

$$FS = \Sigma(pw_i * (CP_i - MP_i)) \quad \text{Equation 1}$$

In one embodiment, the character pixel matrix 263 includes the curvature score. The curvature score may indicate a curvature percentage along strokes of the character. In addition, the character pixel matrix 263 may include the flourish score. The flourish score may count each extraneous flourish added to the character. The character font 260 may be determined as a function of the matching font pixel matrix, the curvature score, and the flourish score.

The character font size 265 may be selected in response to the dimensions of the character. In one embodiment, the character font size 265 is selected in response to a vertical size of the character. Alternatively, the character font size 265 may be selected in response to a horizontal size of the character. In one embodiment, the character font size 265 is selected in response to a combination of the vertical size and the horizontal size of the character.

In one embodiment, a size score is calculated for the character. The size score SS may be calculated using Equation 2, where VH is the vertical height of the character, HH is the horizontal width of the character, and k1 and k2 are nonzero constants.

$$SS = (k1 * VH) + (k2 * HW) \quad \text{Equation 2}$$

The size score may be used as an index to select the character font size 265 from a table. In one embodiment, the character width 275 is a width of the character.

In one embodiment, the character weight 270 may be calculated as a function of the character stroke widths. The character stroke width may be an average of the stroke widths over each stroke of a character. In one embodiment, the character weight 270 is a standard weight that is closest to the character stroke widths. For example, a character weight 270 of one may be selected for character width of 1.2 millimeters (mm).

The character stroke pressure 280 may be calculated from the pressure applied to the touch screen display 110 while writing the character. In one embodiment, the character stroke pressure 280 is an average pressure over the length of each stroke of the character.

The character color 285 may be a color of the character. A user may specify the color while entering the handwritten input 115. The character size 290 may include the vertical height in the horizontal width of the character. In addition, the character size 290 may include an area of the character. The area may be expressed in millimeters squared ($mm^2$).

The character stroke slant 295 may be calculated as a mean angular deviation from a standard stroke slant for each stroke in the character. Alternatively, the character stroke slant 295 may be calculated as the mean angular deviation from the standard stroke slant for each vertical stroke in the character.

The render slant 281 may be calculated as a function of the character stroke slant 295 and the global character slant 245. A character may be rendered with the render slant 281. The render color 282 may be calculated as a function of the character color 285 and the global character color 235. The character may be rendered with the render color 282. The render weight 283 may be calculated as a function of the character weight 270 and the global render weight 220. The character may be rendered with the render weight 283.

Figure 2C:
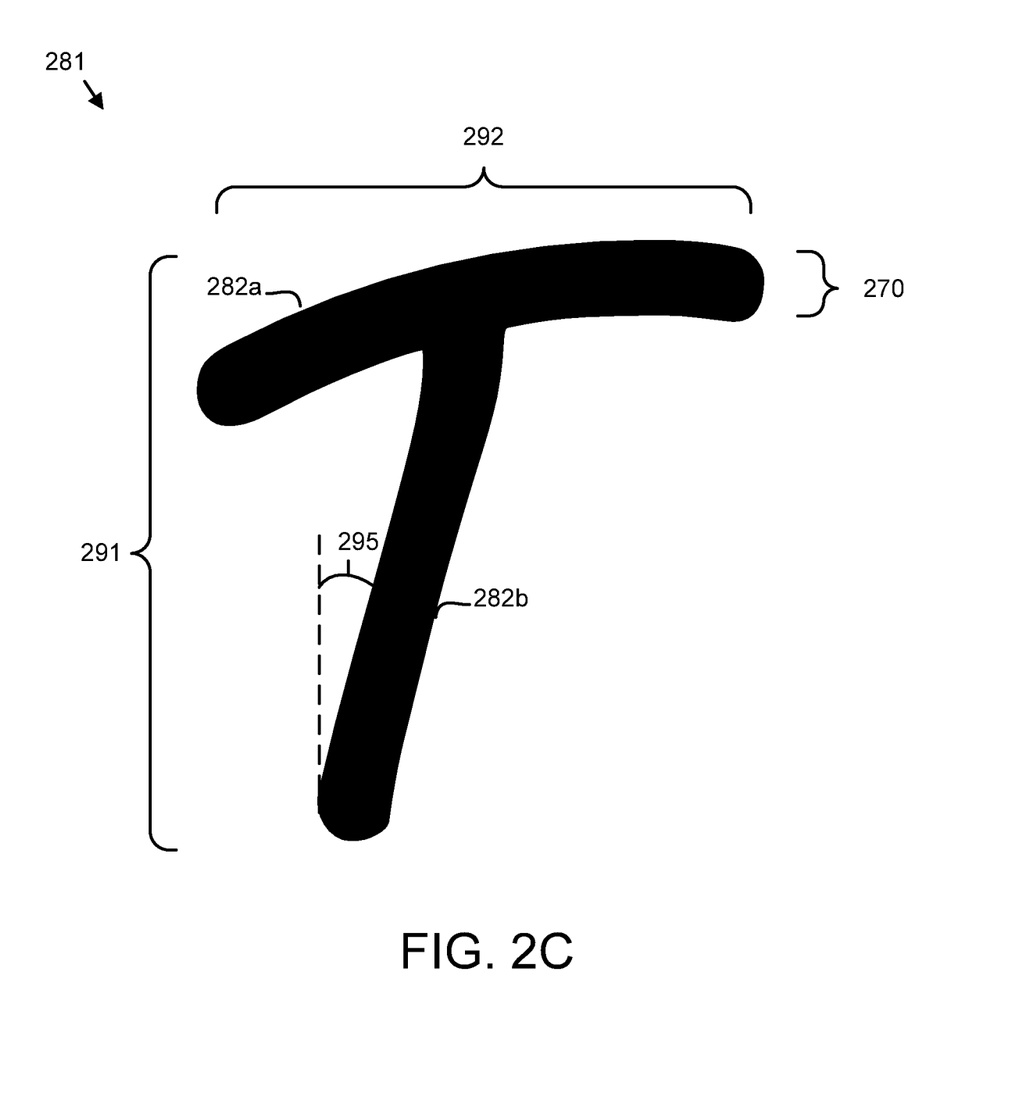
FIG. 2C is a drawing illustrating one embodiment of a handwritten character.

FIG. 2C is a drawing illustrating one embodiment of a handwritten character 281. The handwritten character 281 may be included in the handwritten input 115. The handwritten character tuner 81 includes one or more strokes 282. The handwritten character 281 has a vertical height 291 and a horizontal width 292. In the depicted embodiment, the character stroke slant 295 of the handwritten character 281 is shown as the mean angular deviation from a vertical standard stroke slant.

In the depicted embodiment, a character weight 270 is shown for a first stroke 282a. The character weight 270 may be calculated as an average width over the length of all strokes in the character 281.

Figure 3:
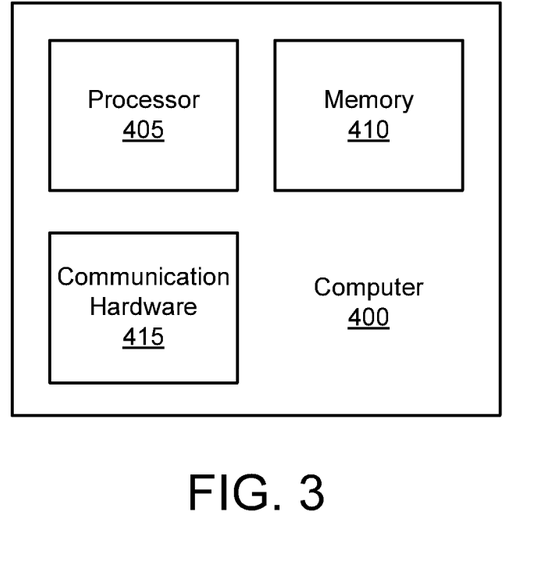
FIG. 3 is a schematic block diagram illustrating one embodiment of a computer.

FIG. 3 is a schematic block diagram illustrating one embodiment of a computer 400. The computer 400 may be embodied in the touch screen display system 100. Alternatively, the computer 400 may be embodied in a server in communication with the touch screen display system 100. The computer 400 includes a processor 405, a memory 410, and communication hardware 415. The memory 410 may be a computer readable storage medium. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices.

Figure 4:
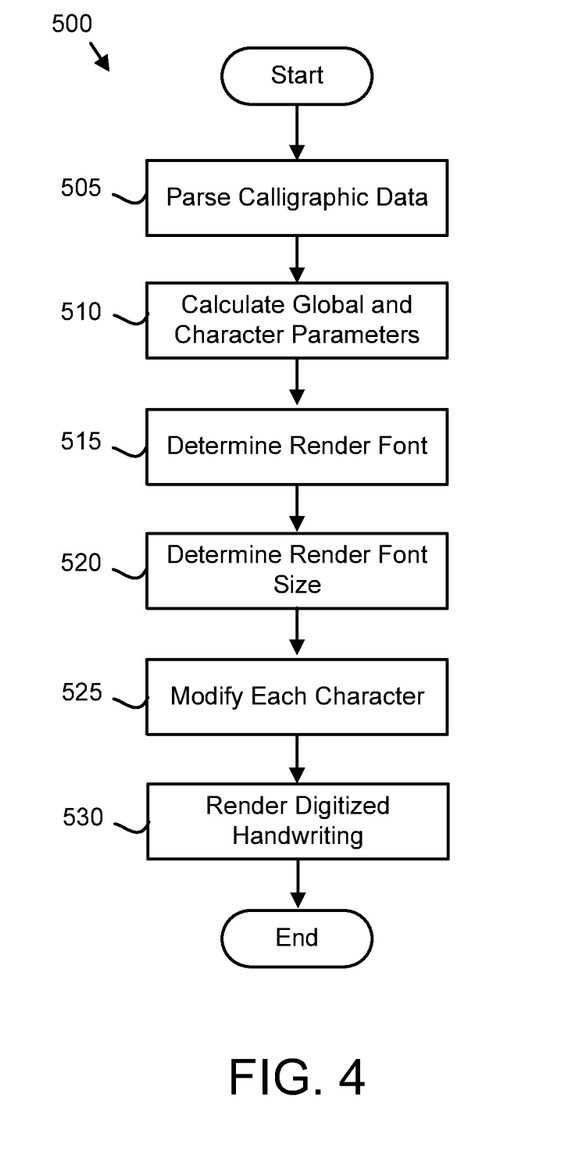
FIG. 4 is a schematic flow chart diagram illustrating one embodiment of a digitized handwriting rendering method.

FIG. 4 is a schematic flow chart diagram illustrating one embodiment of a digitized handwriting rendering method 500. The method 500 may render the digitized handwriting that incorporates the calligraphic data of the handwritten input 115. The method 500 may be performed by the processor 405. Alternatively, the method 500 may be performed by computer readable storage medium storing code that is executable by the processor 405.

The method 500 starts, and in one embodiment, the code parses 505 the calligraphic data 200 from the handwritten input 115. In one embodiment, the code identifies each character 281 and an area for each character 281 within the handwritten input 115. In addition, the code may generate the character pixel matrix 263 for each character 281 and determine the character font 260 from the character pixel matrix 263.

In one embodiment, the code parses 505 the character size 290 for each character 281. In addition, the code may parse the character width 275 and the character weight 270 for each character 281. The code may further parse 505 the character stroke pressure 280 as each character 281 is entered on the touch screen display 110.

In one embodiment, the code parses 505 the character color 285 from an active color for handwriting entry. Alternatively, the code parses 505 the character color 285 as a function of the character stroke pressure 280. For example, a light character stroke pressure 280 may be parsed as a default color such as black while a heavy character stroke pressure 280 may be parsed as an emphasis color such as red.

The code may parse 505 the character stroke slant 295 from each character 281. In one embodiment, the character stroke slant 295 is normalized to a character line vector. The character line vector may be calculated as the vector passing below each character 281 in a line of characters 281 with the least average distance from the vector to a lowest portion of each character 281.

In one embodiment, the code calculates 510 global and character values for the calligraphic data 200. The code may calculate the character font size 265 as a function of the character font 260, the character size 290, and/or the character width 275.

In addition, the code may calculate 510 the global render weight 220 from the character weights 270, the global character width 225 from the character widths 275, the global stroke pressure 230 from the character stroke pressures 280, the global character color 235 from the character colors 285, the global character font size 240 from the character font size 265, the global character stroke slant 245 from the character stroke slant 295, and the global character font 247 from the character fonts 260.

In one embodiment, the code determines 515 the render font 210. The render font 210 may be selected in response to one or more of the character stroke slant 245 and the character pixel matrix 263 of one or more characters 281. For example, the render font 210 may be determined 515 as the most common character font 260 determined from the character pixel matrices 263 modified by the character stroke slants 245.

Alternatively, the render font 210 may be determined 515 as the global character font 247. In a certain embodiment, the render font 210 is determined 515 as the global character font 247 modified by a user preference 303. For example, the render font 210 may be a user preference font most similar to the global character font 247.

In one embodiment, the code determines 520 the render font size 215. The render font size 215 may be the global character font size 240. In one embodiment, the render font size 215 is an absolute character size such as the global character font size 240. In a certain embodiment, the render font size 215 is relative to an average character size 260 of the handwritten input 115.

In addition, the render font size 215 may be determined 520 relative to a specified font size from the user preferences 303. For example, the render font size 215 may be equal to the specified font size from the user preferences 303.

Alternatively, the render font size 215 may be the global character font size 240 modified by a user preference font size. In one embodiment, the render font size 215 is set to a user preference minimum font size such as 14 points. Alternatively, the render font size 215 may be equal to a smallest character font size 265 for the handwritten input 115. In one embodiment, the render font size 215 is equal to the largest character font size 265 for the handwritten input 115.

The code may modify 525 each character 281 in the digitized handwriting in response to the character data 250. The code may modify 525 each character 281 in response one or more of the character stoke width 275, the character color 285, the character stroke pressure 280, and the character stroke slant 295. Alternatively, the code may modify 525 each character 281 in response to one or more of the character pixel matrix 263, the character font size 265, the character weight 270, the character width 275, the character stroke pressure 280, the character color 285, the character size 290, and the character stroke slant 295.

In one embodiment, the character 281 may be displayed with the character font 260 instead of the render font 210. In one embodiment, the character font 260 is used in place of the render font 210 if a ratio of the font score for the character font 260 and the character pixel matrix 263 of the character 281 and the font score for the font pixel matrix of the render font 210 and the character pixel matrix 263 is less than a font ratio threshold. The font ratio threshold may be in the range of 0.1 to 0.8.

In one embodiment, the character 281 may be displayed with the character weight 270 instead of the global render weight 220. The character weight 270 may be employed if the ratio of the character weight 270 and the global render weight 220 exceeds a weight ratio threshold. In one embodiment, if the ratio of the character weight 270 in the global render weight 220 exceeds the weight ratio threshold, the character 281 may be bolded.

In one embodiment, the character 281 is rendered with a weight modified in response to the character stroke pressure 280. Alternatively, the character 281 may be rendered with a weight modified in response to the character width 270.

The character 281 may be displayed with the character color 285 instead of the global character color 235. In one embodiment, the character color 285 is employed instead of the global character color 235 for the character 281 if the character color 205 is different from the global character color 235.

The character 281 may be displayed with the character stroke slant 295 instead of the global character stroke slant 245. The character stroke slant 295 may be employed if a ratio of the character stroke slant 295 to the global character stroke slant 245 exceeds a slant ratio threshold.

In one embodiment, the code renders 530 the digitized handwriting and the method 500 ends. The code may render 530 the digitized handwriting by rendering each character 281 using one of the render font 210 and the character font 260, the render font size 215 and the character font size 265, the global render weight 220 and the character weight 270, the global character color 235 and the character color 285, the global render weight 220 and the character weight 270, and the global character stroke slant 245 and the character stroke slant 295.

Figure 5A:
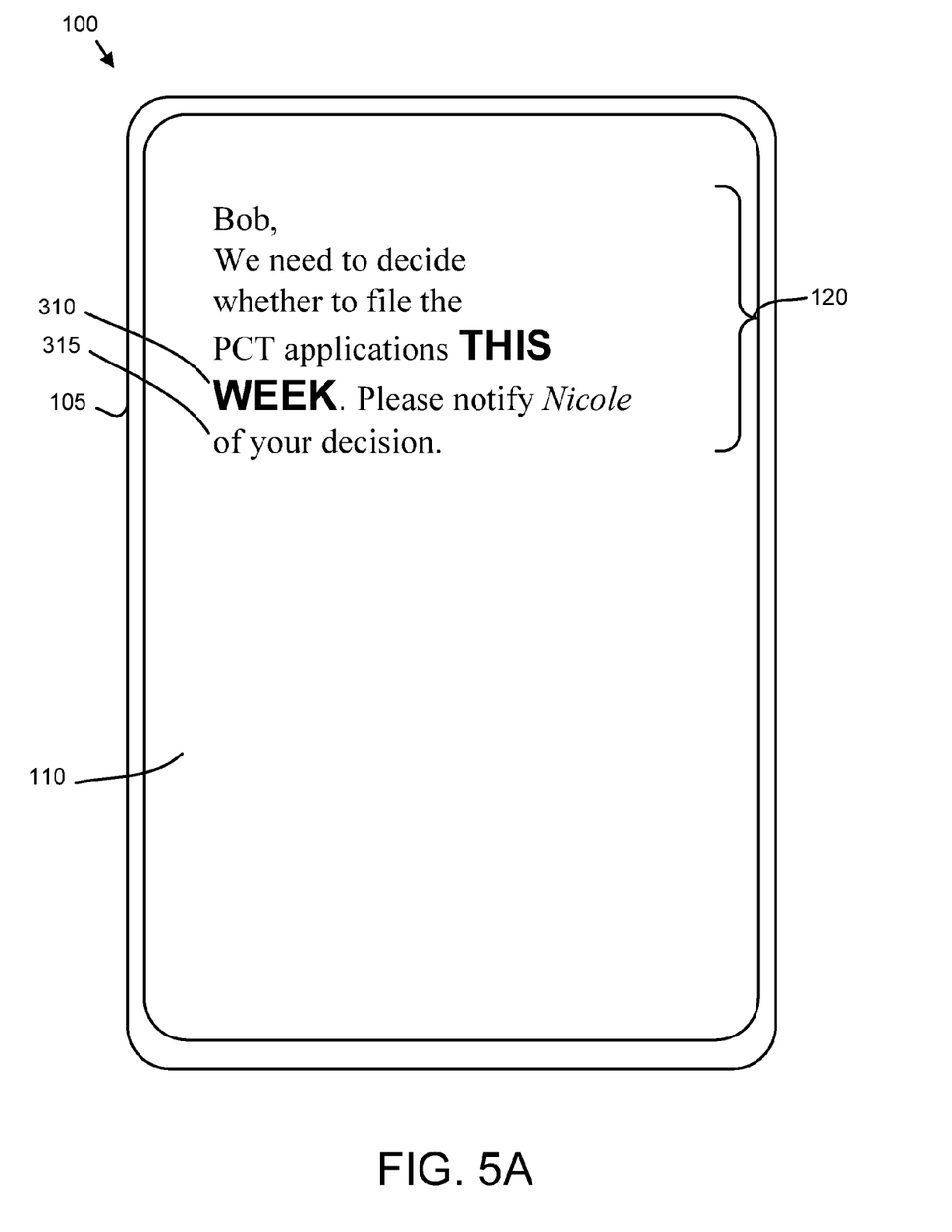
FIG. 5A is a drawing illustrating one embodiment of a touch screen display with rendered digitized handwriting.

FIG. 5A is a drawing illustrating one embodiment of a touch screen display system 100 with rendered digitized handwriting 120 in typographic characters. In the depicted embodiment, most characters in the digitized handwriting 120 are displayed with the render font 210 and the render font size 215. In addition, the digitized handwriting 120 may be displayed with the global render weight 220, the global character color 235, and the global character stroke slant 245. In addition, the text "THIS WEEK" 310 is displayed with an alternate character weight 270, character font 260, and character size 290. The text "Nicole" 315 is displayed with an alternate character font 260 and/or alternate character stroke slant 295.

Figure 5B:
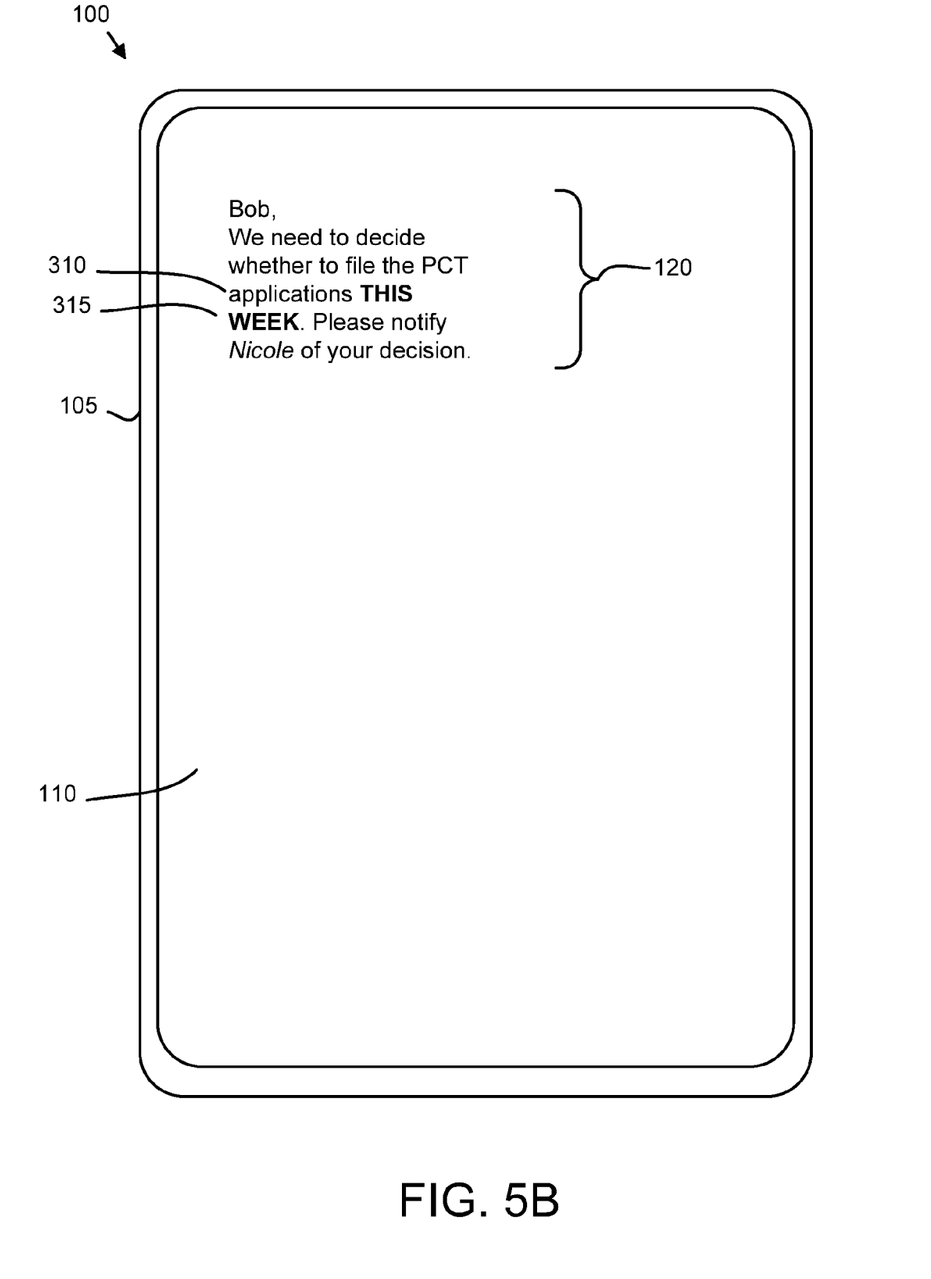
FIG. 5B is a drawing illustrating one alternate embodiment of a touch screen display with rendered digitized handwriting.

FIG. 5B is a drawing illustrating one alternate embodiment of a touch screen display system 100 with rendered digitized handwriting 120. In the depicted embodiment, the digitized handwriting 120 is rendered with the original line breaks preserved in response to the user preferences 303. The text "THIS WEEK" 310 is displayed with an alternate character weight 270 and character font 260 in response to the user preferences 303. The text "Nicole" 315 is displayed with an alternate character font 260 and/or alternate character stroke slant 295 in response to the user preferences 303.

Figure 5C:
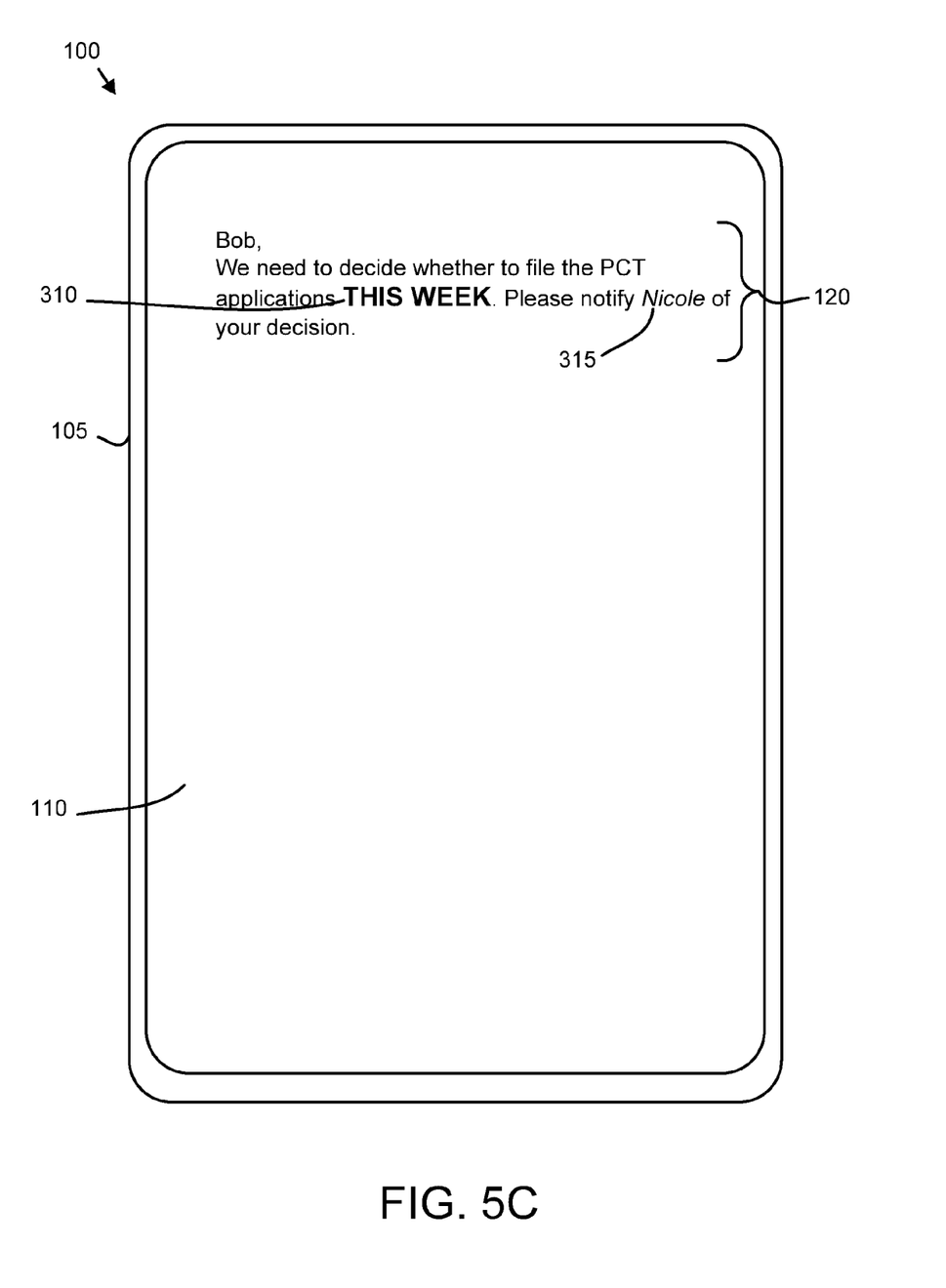
FIG. 5C is a drawing illustrating one alternate embodiment of a touch screen display with rendered digitized handwriting.

FIG. 5C is a drawing illustrating one alternate embodiment of a touch screen display system 100 with rendered digitized handwriting 120. In the depicted embodiment, the digitized handwriting 120 is rendered with each character employing the render font 210 and the render font size 215. The text "THIS WEEK" 310 is displayed with an alternate character weight 270, character font 260, and character size 290 in response to the user preferences 303. The text "Nicole" 315 is displayed with an alternate character font 260 and/or alternate character stroke slant 295 in response to the user preferences 303. In addition, line breaks are not preserved in response to the user preferences 303.

The embodiments parse calligraphic data 200 from the digitized handwriting 115 on the touch screen display 110. By rendering the digitized handwriting 120 with the render font 210 selected in response to one or more of the character stroke slant 295 and the character pixel matrix 263, the embodiments render the digitized handwriting 120 is similar to the original handwritten input 115.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a touch screen display;
   a processor;
   a memory that stores code executable by the processor to parse calligraphic data from digitized handwriting on the touch screen display, the calligraphic data comprising a character stroke slant and a character pixel matrix;
   determine a render font selected in response to one or more of the character stroke slant and the character pixel matrix;
   in response to a ratio of a font score for character pixel matrix of a first character font of the digitized handwriting and a first character font, and a font score for a font pixel matrix of the render font and the character pixel matrix being less than a font ratio threshold, select the first character font for the first character in place of the render font, wherein the first character font is different form the render font;
   render the digitized handwritten with the render font; and
   render the first character with the first character font.

2. The apparatus of claim 1, wherein the calligraphic data further comprises a character size and a render font size is determined in response to the character size.

3. The apparatus of claim 2, wherein the render font size is an absolute character size.

4. The apparatus of claim 2, wherein the render font size is relative to an average character size of the digitized handwriting.

5. The apparatus of claim 2, wherein the render font size is relative to a specified font size.

6. The apparatus of claim 1, wherein the calligraphic data further comprises one or more of a character width, a character color, and a character stroke pressure, and the processor further selects the first character font in response one or more of the character width, the character color, the character stroke pressure, and the character stroke slant.

7. The apparatus of claim 6, wherein a rendered slant of the first character font is modified in response to the character stroke slant, a rendered color of the first character font is modified in response to the character color, and a rendered weight of the first character font is modified in response to one or more of the character stroke pressure and a character weight.

8. A method comprising:
   parsing, by use of a processor, calligraphic data from digitized handwriting on the touch screen display, the calligraphic data comprising a character stroke slant and a character pixel matrix;
   determining a render font selected in response to one or more of the character stroke slant and the character pixel matrix;
   in response to a ratio of a font score for character pixel matrix of a first character font of the digitized handwriting and a first character font, and a font score for a font pixel matrix of the render font and the character pixel matrix being less than a font ratio threshold, selecting the first character font for the first character in place of the render font, wherein the first character font is different form the render font;
   rendering the digitized handwritten with the render font; and
   rendering the first character with the first character font.

9. The method of claim 8, wherein the calligraphic data further comprises a character size and a render font size is determined in response to the character size.

10. The method of claim 9, wherein the render font size is an absolute character size.

11. The method of claim 9, wherein the render font size is relative to an average character size of the digitized handwriting.

12. The method of claim 9, wherein the render font size is relative to a specified font size.

13. The method of claim 8, wherein the calligraphic data further comprises one or more of a character width, a character color, and a character stroke pressure, and the method further selects the first character font in response one or more of the character stoke width, the character color, the character stroke pressure, and the character stroke slant.

14. The method of claim 13, wherein a rendered slant of the first character font is modified in response to the character stroke slant.

15. The method of claim 13, wherein a rendered color of the first character font is modified in response to the character color.

16. The method of claim 15, wherein the character color of the first character font is modified in response to the character stroke pressure.

17. The method of claim 13, wherein a rendered weight of the first character font is modified in response to the character stroke pressure.

18. The method of claim 13, wherein a rendered weight of the first character font is modified in response to a character weight.

19. A program product comprising a non-transitory computer readable storage medium that stores code executable by a processor, the executable code comprising code to perform:
   parsing calligraphic data from digitized handwriting on the touch screen display, the calligraphic data comprising a character stroke slant and a character pixel matrix;
   determining a render font selected in response to one or more of the character stroke slant and the character pixel matrix
   in response to a ratio of a font score for character pixel matrix of a first character font of the digitized handwriting and a first character font, and a font score for a font pixel matrix of the render font and the character pixel matrix being less than a font ratio threshold, selecting the first character font for the first character in place of the render font, wherein the first character font is different form the render font;
   rendering the digitized handwritten with the render font; and
   rendering the first character with the first character font.

20. The program product of claim 19, wherein the calligraphic data further comprises a character size and a render font size is determined in response to the character size.

* * * * *